March 11, 1969 G. K. C. HARDESTY 3,432,243
RATIO SPECTRORADIOMETER
Filed Oct. 10, 1963 Sheet 1 of 5

INVENTOR
George K.C. Hardesty
BY Birch and O'Brien
ATTORNEYS

March 11, 1969 — G. K. C. HARDESTY — 3,432,243
RATIO SPECTRORADIOMETER

Filed Oct. 10, 1963

INVENTOR
George K. C. Hardesty
BY Birch and O'Brien
ATTORNEYS

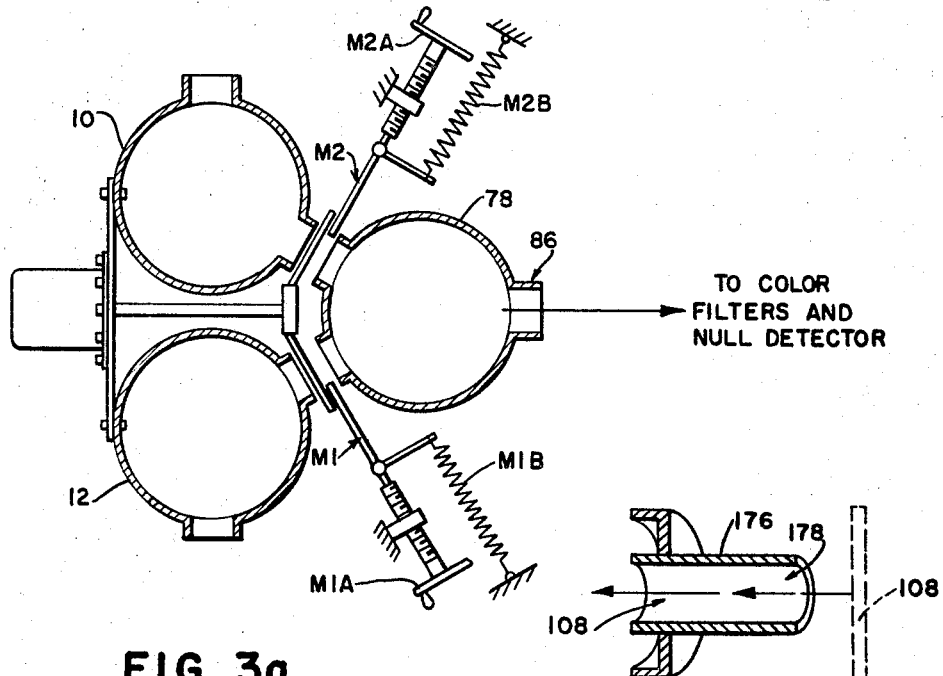
FIG. 3a.
FIG. 7.
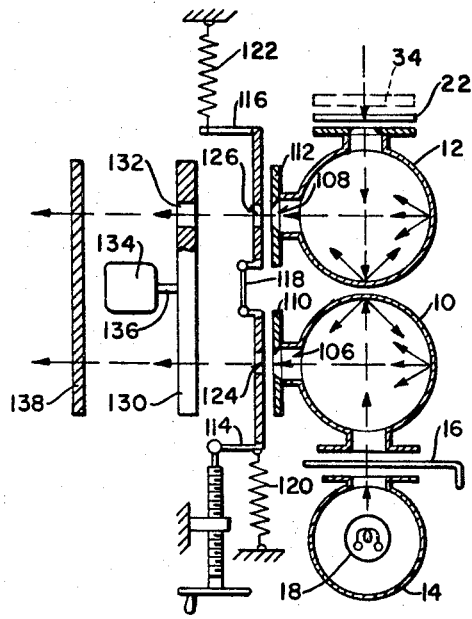
FIG. 4.
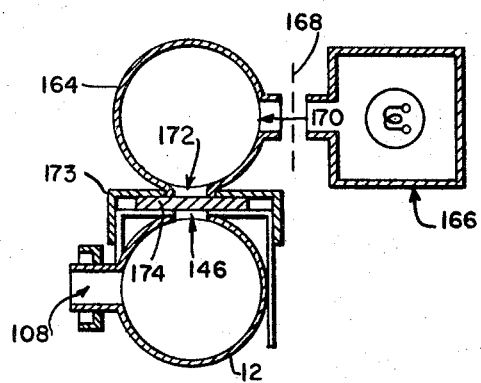
FIG. 6.

INVENTOR
George K. C. Hardesty
BY Birch and O'Brien
ATTORNEYS

United States Patent Office 3,432,243
Patented Mar. 11, 1969

3,432,243
RATIO SPECTRORADIOMETER
George K. C. Hardesty, Box 156, Mayo, Md. 21106
Filed Oct. 10, 1963, Ser. No. 315,412
Int. Cl. G01j 3/50; G01n 21/22
U.S. Cl. 356—176         13 Claims

ABSTRACT OF THE DISCLOSURE

The disclosure depicts a ratio spectroradiometer which is especially adapted to compare the light from two separate sources. The device consists of at least two integrating spheres, for reference and sample source respectively, which provide diffuse illumination without interaction between the two sources to a comparison colorimeter.

---

This invention relates to the art of colorimeters and spectro-analyzers and more particularly to ratio spectroradiometers for direct analysis of the spectral emission from proximate thermal, radioactive, electroluminescent and bio-luminescent luminous sources, or similar or other remote luminous sources and the like over a wide range of light intensities. It applies to a broad field of physical research including the analysis of natural phenomena such as changes in the light from the northern sky with various times of the day.

The prior art of spectro-analysis is primarily concerned with the analysis of transparent or solid (opaque) color sample and the like through the utilization of high values of light intensity provided as part of the means of analysis and therefore, the direct analysis of luminous sources, and particularly such sources as panel and instrument lamps of less than one candlepower, remote high intensity sources, luminescent fluids and materials is not practically possible. Only very formal research type spectroradiometric laboratory equipment has, in the past, been successfully used for such analysis and even this has required more energy than is available from many of the sources or signal light devices that are used in modern electronic control consoles.

It is therefore an object of this invention to provide a new and novel ratio spectroradiometer which is relatively low in cost and which is adequate for spectral analysis of low intensity sources of illumination as well as those of higher intensity.

It is another object of this invention to provide a new and novel ratio spectroradiometer which will analyze remote sources of illumination.

Another object of this invention is to provide a new and novel ratio spectroradiometer which will measure the total or diffuse spectral transmittance of translucent samples as well as the spectral emission of diffuse or other distributed luminous sources.

Another object of this invention is to provide a new and novel ratio spectroradiometer which will make spectrogoniometric determinations.

Still another object of this invention is to provide a new and novel ratio spectroradiometer which will determine spectral reflectance characteristics of solids for any desired illuminant.

Still another object of this invention is to provide a new and novel ratio spectroradiometer which will determine the color temperature of light sources with accuracy and precision.

Yet another object of this invention is to provide a ratio-type, tri-stimulus radiometer, photometer, reflectometer, and goniometer through the use of red, green, and blue broad band filters having in combination with the photoreceptor, characteristics simulating the tri-stimulus color response functions of human vision.

These and other objects of this invention will become more fully apparent with reference to the following specification and drawings which relate to several preferred embodiments of the invention.

Figure 1:
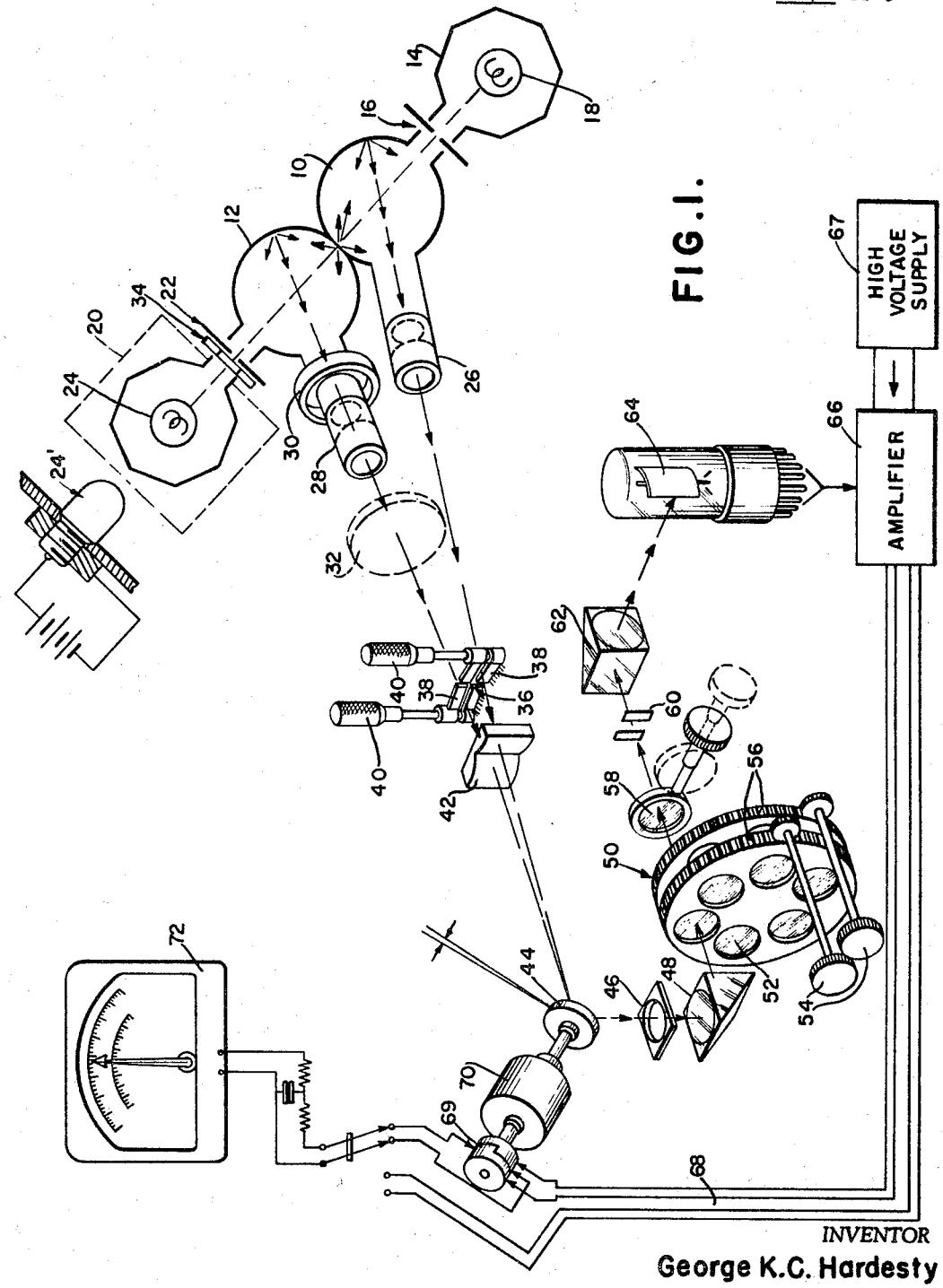
Figure 2:
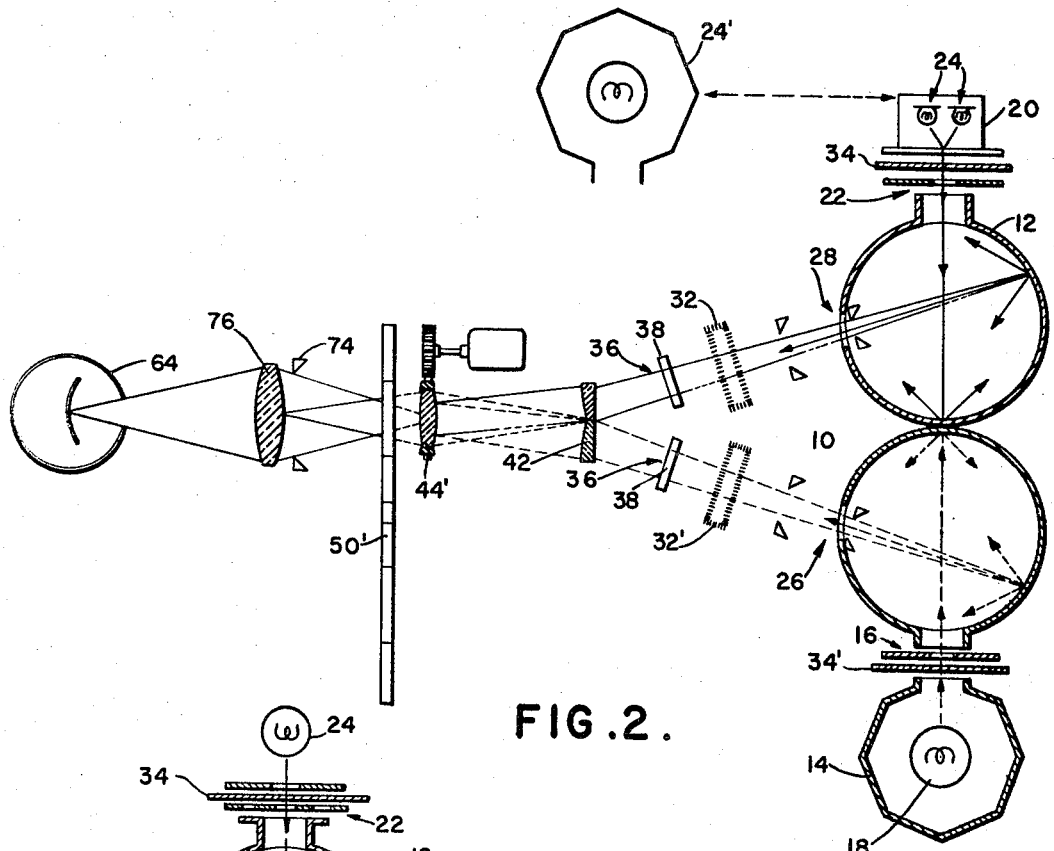
Figure 3:
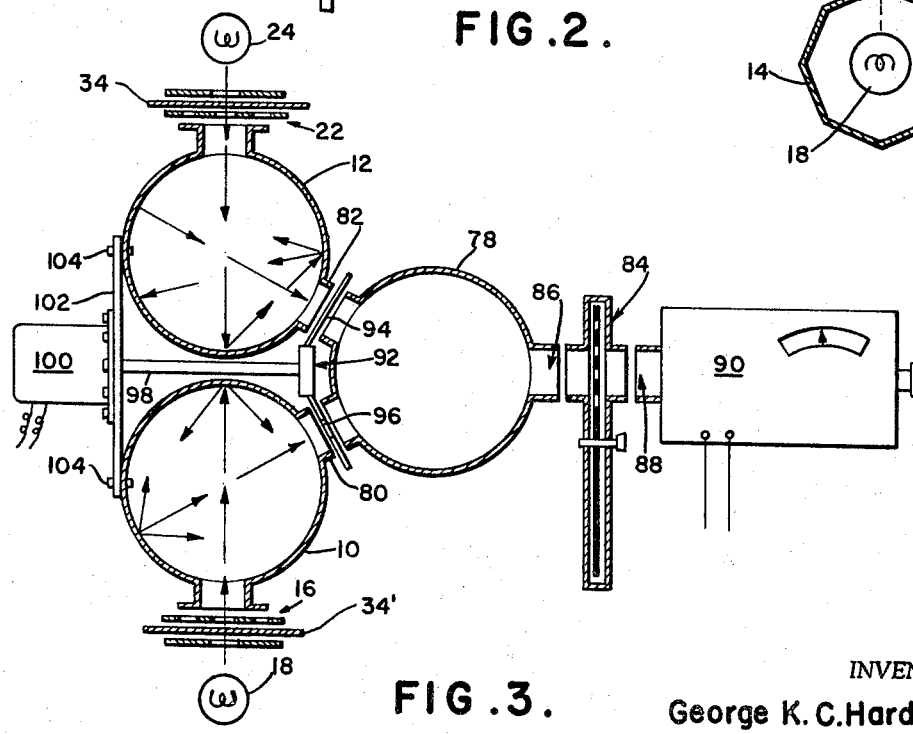
Figure 5:
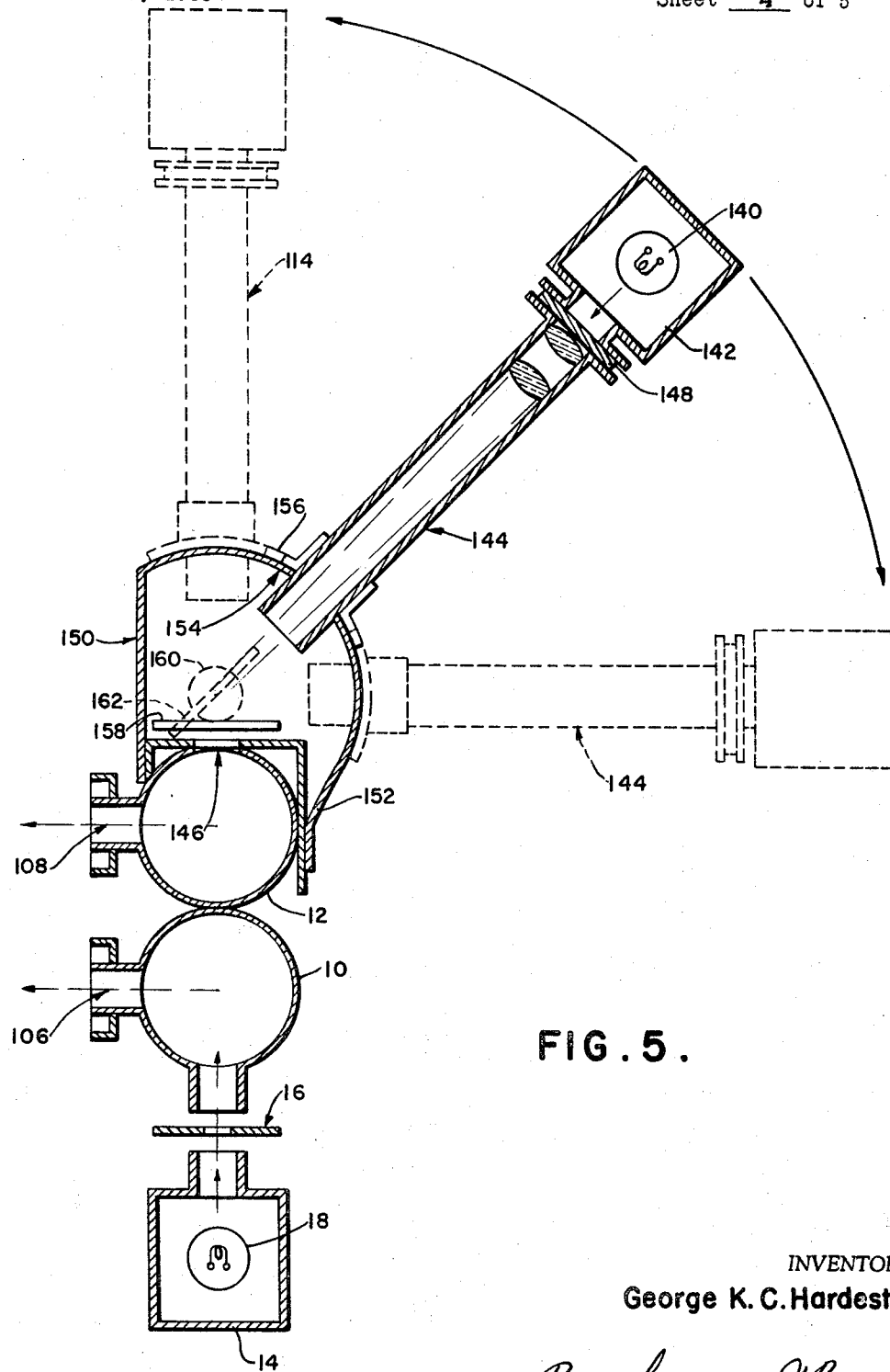
Figure 8:
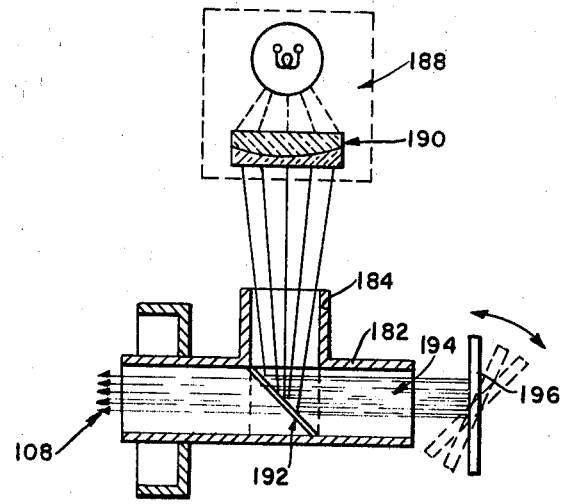
Figure 9:
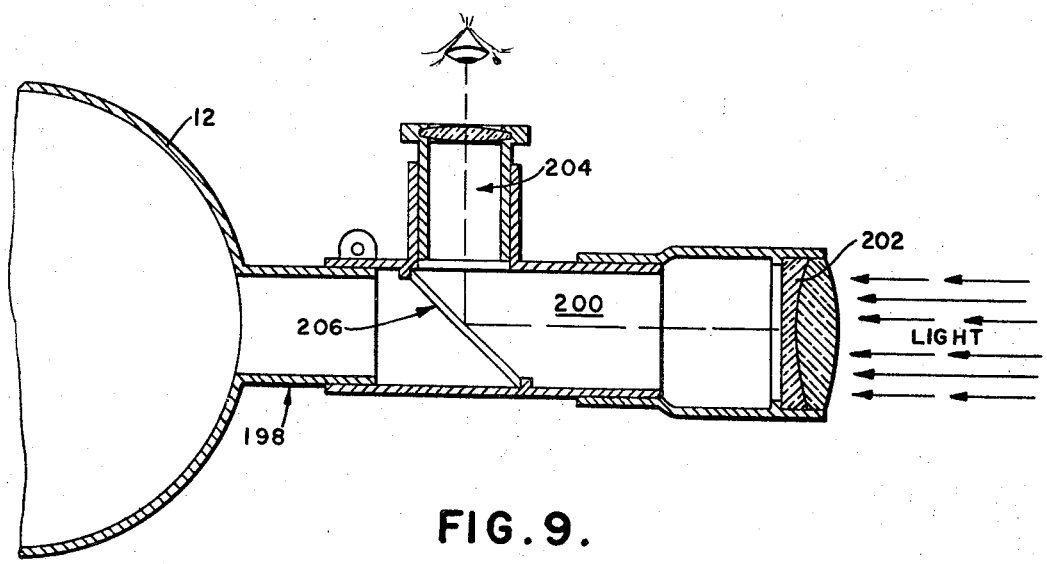

In the drawings:
FIGURE 1 is a schematic layout, in perspective, of a ratio spectroradiometer including the present invention;
FIGURE 2 is a schematic diagram of a second embodiment of the invention;
FIGURE 3 is a schematic diagram of a third embodiment of the invention;
FIGURE 3a is a schematic of a modification of FIGURE 3;
FIGURE 4 is a schematic of a fourth embodiment of the invention;
FIGURE 5 is a schematic of a fifth embodiment of the invention;
FIGURE 6 is a schematic of a sixth embodiment of the invention;
FIGURE 7 is a schematic of a seventh embodiment of the invention;
FIGURE 8 is a schematic of an eighth embodiment of the invention; and
FIGURE 9 is a schematic of a ninth embodiment of the invention;

Referring in detail to the drawings, and more particularly to FIGURE 1, the spectroradiometer of the present invention is shown as including first and second light integrating spheres comprising a reference sphere 10 and a sample sphere 12, respectively.

A reference lamp housing 14 is provided adjacent the reference sphere 10 and connected therewith through a first normalizing iris 16. A reference lamp or source 18 is provided in the reference housing 14.

A sample lamp housing 20 is provided adjacent the sample sphere 12 and connected therewith through a second normalizing iris 22. A sample comprising a lamp or an auxiliary light source 24 is placed in the sample housing 20. An additional reference lamp 24' is shown adjacent the lamp housing 20 for a purpose to be hereinafter more fully described.

Light output is taken from the reference and sample spheres 10 and 12 via first and second tubular light stops 26 and 28, respectively, the latter being removably coupled to the sample sphere 12 via a flange coupling 30 or the like.

A transmission sample 32 such as a reference transparency or filter to be analyzed is placed in the light path of the second light stop 28. Alternatively, the reference or sample transparency 32 may be placed adjacent the second iris diaphragm 22 as shown at 34.

Next in the optical path with the transmission sample 32 and the light outputs from the reference sphere 10 are individual micrometric zeroing slits 36, each defined by a pair of vertical plates 38 having micrometer knobs 40 thereon for effecting relative movement of the plates to change the slit dimensions and thereby control the amount of light passing therethrough, the light being received from the light stops 26 and 28 in the form of converging rays.

Beyond the zeroing slits 36 is a double prism 42, which brings the beams from the reference and sample spheres 10 and 12, respectively, to a focus on a rotary wobble plate or mirror 44, as is well-known in the art as evidenced by FIGURE 1 of Patent 2,686,452 to Bentley, which alternately directs light from each of the two beams through a light stop 46 and a prism 48 to color wheels 50 having a plurality of color filters 52 disposed thereon adjacent the peripheries thereof. The filters 52 are of the band pass and tri-stimulus function of the human sight types, thus providing a plurality of spectral formats for analysis.

Selection of the filters 52 is effected by geared selector knobs 54 driving the color wheel 50 via annular gear tracks 56 thereon.

The light beam, after passing through the filters 52 passes through another filter 58 which is replaceably mounted, then through a horizontal aperture stop 60 and a prism 62 to photoreceptor comprising a photomultiplier detector tube 64.

The detector tube 64 is housed in an amplifier unit 66, fed by a voltage supply 67, which amplifier provides an output of a polarity dependent on the ratio of the strength of the two light beams alternately impinging on the detector tube 64.

The output of the amplifier 66 passes through suitable circuitry 68 to a commutator 69 on drive motor 70 for the rotating mirror 44 to effect a readout on a null-balance type instrument such as a galvanometer 72. The function and operation of this circuitry is well-known in the art as shown by Patent 2,686,452 to Bentley.

Referring now to FIGURE 2, wherein like parts to FIGURE 1 bear like numerals, the beams emitted from the double lens 42 is passed through a motor driven flicker lens 44', a color wheel 50', light stop 74 and lens 76 to the photoreceptor detector tube 64. A transmission standard 32' is positioned in the reference beam from the sphere 10 and an alternative position therefore is shown at 34' adjacent the iris aperture 16.

Referring to FIGURE 3, the third embodiment of the invention is shown as including the reference sphere 10, sample sphere 12, first and second iris diaphragms 16 and 22, respectively, reference source 18, and sample source 24.

The output from the reference and sample spheres 10 and 12 is coupled to a third or mixing sphere 78 through reference and sample apertures 80 and 82, respectively.

The light output from the mixing sphere 78 is passed to a color wheel assembly 84 via an aperture 86 and thence through an aperture 88 to a monitoring means 90 comprising a ratio-type pulse analyzer.

Alternate admittance of light rays from the reference and sample spheres 10 and 12 is provided by a shutter assembly 92.

The reference and sample apertures are so oriented as to be each axially perpendicular to the walls of a hollow perforated conical shutter plate 94 having a plurality of shutter openings 96 therein about the periphery of the cone in registry with the said reference and sample apertures 80 and 82. The shutter openings 96 are staggered such that only one or the other of the reference and sample apertures is open at any given time to transmit light to the mixing sphere.

The shutter 94 is axially mounted on one end of a rotary shaft 98 extending between the reference and sample spheres 10 and 12 out of a shutter drive motor 100 mounted on a plate 102 fixed to the reference and sample spheres 10 and 12 by suitable fastener means 104.

An alternate embodiment is shown in FIGURE 3a as including first and second micrometer light gate means M1 and M2 adjacent the shutter means 94 at the reference and sample output apertures 80 and 82, respectively.

First and second micrometer dials M1A and M2A, respectively, are connected with the micrometer light gate means M1 and M2 as the first and second biasing springs M1B and M2B, respectively.

The output orifice 86 of the mixing sphere 78 leads to color filters and a null detector similar to the systems of FIGURES 1 and 2 with the light choppers 44 and 44', respectively, and the micrometer slits 36 being removed since their equivalents are built into the sphere array of FIGURE 3a.

Referring next to FIGURE 4, the fourth embodiment of the invention is shown as being substantially identical as to the reference and sample spheres 10 and 12, first and second iris apertures 16 and 22, and light sources as the embodiments of FIGURES 1 and 2. Transmission sample 34 is placed adjacent the second iris aperture.

The light outputs of the reference and sample spheres 10 and 12 are through reference and sample apertures 106 and 108, respectively, the same apertures comprising tubular extensions from the respective spheres which are axially parallel and which terminate in first and second flanges 110 and 112, respectively, having flat end faces.

Immediately adjacent the end faces of the first and second flanges 110 and 112 are reference and sample aperture calibrating means 114 and 116, respectively, in the form of apertured plates parallel with the end faces of the said flanges. The calibrating means 114 and 116 are releasably interconnected by a central link 118 and are resiliently maintained in position by means of first and second springs 120 and 122, respectively.

The reference and sample calibrating apertures 124 and 126 in the plates of the calibrating means 114 and 116, respectively, are positioned such that the reference calibrating aperture is in full registry with the reference outlet aperture 106 when the sample calibrating aperture 126 is in less than full registry with the sample outlet aperture 108 and vice versa and are brought into varying degrees of registry with the reference and sample apertures 106 and 108, respectively, by means of a calibrated crank 128 or the like which is rotatably connected with one side of the reference calibrating means 114.

A light modulator in the form of a rotating disk 130 having apertures 132 therethrough, and driven by a motor 134 and shaft 136 on which it is mounted, is positioned in front of the calibrating means 114 and 116 to alternately transmit light pulses therethrough from the reference and sample spheres 10 and 12, respectively.

Optical filter means 138 for selective spectral analysis is positioned adjacent the modulator disk 130 and the light pulses pass therethrough and on to a suitable photoreceptor.

Referring next to FIGURE 5, a fifth embodiment of the invention is shown including the reference and sample spheres 10 and 12 with their respective output apertures 106 and 108, reference lamp housing 14 and reference lamp 18.

The sample source or lamp 140 is a second reference source and is mounted in a lamp housing 142 at one end of a protractor mounted tubular collimator means 144 which is directed at an area of focus adjacent to and centrally located with respect to the sample inlet aperture 146 of the sample sphere 12. The protractor action of the collimator means 144 is indicated by the dotted line positions thereof. A light filter 148 may be interposed between the sample lamp housing 142 and the tubular collimator 144 for the purpose of selectively altering the characteristics of the sample source.

Three samples for analysis are shown within a light chamber 150 which is mounted on the sample sphere 12 and holds the collimator means 144 in proximity to the sample inlet aperture 146. The light chamber 150 includes a quarter-round cylindrical wall 152 which has a radius of curvature which defines the arc path taken by the protractor mounted collimator means 144. A peripheral slot 154 is cut in the curved wall 152 and a conforming sliding mask 156 is used to mount the collimator means 144 in the said slot 154.

The first sample 158 is shown in solid lines and lies across the sample input aperture 146. This sample is positioned to be tested for its total spectral transmission at various angles of incidence effected by the collimator means 144.

A second sample 160 is shown as a dotted cylinder positioned at the center of curvature of the curved wall 152 of the light chamber 150. This sample is either a liquid or solid which is to be tested for either turbidity or fluorescence. Thus, continuous spectral analysis may be made during chemical reactions.

A third sample 162 is shown in dotted lines as a rectangle and comprises a solid color or fluorescent pigmented surface sample which is to be tested for its surface spectral emission or spectral reflectance characteristics when excited from the sample source 140 and collimator means 144.

The embodiment of FIGURE 2 may be further modified at the sample sphere 12 to adapt the ratio spectroradiometer of the present invention for the analysis of samples for total transmission of diffuse illumination as shown in FIGURE 6.

A third integrating sphere 164 is coupled with a luminous source 166 via an iris aperture 168 and an input aperture 168 and an input aperture 170. The third sphere 164 has an output aperture 172 which is in optical alignment with the sample input aperture 146 of the sample sphere 12.

A telescoping coupling 173 is provided between the sample and third spheres 12 and 164 and comprises a holding chamber for a transmittance sample 174.

In the event of very low energy levels coupled with a uniformly illuminated surface large enough to fill the full field of view of the optical system of the spectroradiometer, the integrating function of the sample sphere 12 to produce uniformity is not needed. As shown in FIGURE 7, the sample sphere may be replaced in FIGURE 4 by an extension tube 176 comprising the sample output aperture 108 at one end and a sample input aperture 178 at the other. The sample 180 is placed immediately adjacent the input aperture 178.

A modified version of the embodiment of FIGURE 7 for line-of-sight reflection analysis is shown in FIG. 8 and comprises an extension tube 182 from the sample output aperture 108 having a radial extension 184 intermediate its ends. The radial extension comprises an input aperture 186 fed by a source 188 and lens system 190.

A half-silvered mirror 192 or the like is placed at a 45° angle to the axis of the radial extension 184 in the extension tube 182 immediately beneath the said radial extension.

The outer end of the extension tube 182 comprises a sample input aperture 194 adjacent which a reflection sample is positioned to effect a desired angle of incidence of the light from the half-silvered mirror 192.

An embodiment of the invention for spectral analysis of remote sources such as distance lamps, the sun, the moon and other like sources is shown in FIGURE 9.

An extension tube 198 on the sample sphere 12 mounts a telescope assembly 200 having an objective lens 202 and an eyepiece assembly 204 radially extending from the assembly 200 and having a partially-silvered mirror 206 associated therewith for the purpose of sighting in on a remote source that is to be analyzed.

If the source is very weak, it may be desirable to remove the sample sphere 12 and mount the telescope assembly on the extension tube 176 of FIGURE 7.

*Operation*

Referring first to FIGURE 1, the operation of that embodiment of the present invention will now be described.

The reference source 18 comprises a 2854° K. lamp against which the sample under test is to be compared.

Assuming all lamps to be illuminated, transmission samples 32 and 34 to be removed, and all circuits energized, the reference sphere 10 is internally illuminated by the reference lamp 18 and the sample sphere 12 is internally illuminated by the sample lamp 24.

For a spectral analysis of the sample lamp 24, the second iris aperture 22 is held full open and the first iris aperture 16 is adjusted until the light transmitted from the reference sphere 10 to the band pass filters 52 on the color wheel 50 is normalized, i.e. is brought to the same energy level as the light from the sample sphere 12. This may be done for convenience with a broad-band, visual luminosity (Y-function) filter in the common path to the photoreceptor.

The beams emitted from the respective spheres are homogeneous and are alternately pulsed to the photoreceptor tube 64 and their relative strength is indicated by the null-detector 72. Thus, the photoreceptor tube 64 view a uniformly luminous field in each of the said beams. The operation of the circuitry involved is fully disclosed in Patent 2,686,452 to Bentley.

Several or all of the band pass filters 52 are placed in turn in the path of the sample and reference beams which are adjusted to equal intensities in each pass band by means of the micrometric zeroing slit 36 in the path of the sample beam. The setting of the zeroing slit 36 at the null-balance condition of the system, is indicative of the relative spectral characteristics of the sample source 24 in each filter pass-band. The zeroing slit 36 may be adjusted to transmit more or less energy of the sample beams relative to the reference beam. Thus, for each filter 52 used, the system is rebalanced via the zeroing slit 36 and a comprehensive relative spectral analysis of the sample source 24 is thereby effected, relative to the reference source's characteristic spectral emission.

For transmittance tests the transmission sample 32 or 34 is located at one of the two positions described in FIGURE 1.

The second reference source 24, in its housing 80, is first standardized for equal spectral distribution by adjusting its current input until its spectral output distribution equals that of the first reference source 18. This is done through comparisons made with pass-band filters distributed over the spectrum until equal settings of the slits 36 demonstrate that the reference and sample spheres are illuminated with spectrally identical illuminants.

The sequential pass-band analysis of sample 32 with the filters 52 is subsequently made with the various micrometer settings of the zeroing slit 36. The resulting data is an indication of the relative spectral transmittance of the sample 34 or 32, relative to the spectral emission of the 2854° K. reference source. By simple computation these data can be made relative to equal energy.

In both of the above-defined analyses, if it should occur that the sample source 24 or 24' is of greater intensity than the reference source 18, then the first iris aperture 16 would be operated wide open and the second iris aperture 22 would be adjusted to achieve the normalized condition of the sample and reference beams.

When it is desired to obtain the actual transmittance of sample 32 at any spectral band rather than relative transmission values, the reference and sample sources 18 and 24 are normalized prior to the insertion of the said transmission sample into the spectroradiometer. For example, with the calibrated slit full open (i.w. set at 100%) the first and second irises 16 and 22 respectively are adjusted until a null indication is provided on the null-detector 72, at which time, for the pass-band of the particular filter 52 in use during the adjustment, a reference or normalized adjustment has been made. The second reference lamp 24' may also be compared with the reference 18 in all the contemplated pass-bands and compatible identical reference sources are thus readily provided when all of the pass-bands provide a null indication without adjusting the double zeroing slit 36. Odd shaped sample color filters, not shown, may be placed over this lamp for subsequent spectral analysis.

In FIGURE 2, the operation is substantially identical to the embodiment of FIGURE 1 with the exception of the beam pulsing lens 44'. Basically, however, the operation is identical and is also adequately defined as to the system except the portion not including the integrating spheres 10 and 12, associated sources 18 and 24 and iris apertures 16 and 22, respectively, and their relationship with the zeroing slit 36 to provide normalization of the system.

Referring now to FIGURE 3, the sources 18 and 24 and iris apertures 16 and 22 cooperates with the reference and sample spheres 10 and 12, respectively, as in FIGURES 1 and 2.

When the motor 100 is energized, the conical perforated shutter plate 94 rotates and alternately places an aperture 96 thereon in registry with the reference and sample output apertures 80 and 82, respectively, of the reference and sample spheres 10 and 12.

As a result reference and sample pulses of light energy are alternately integrated in the third sphere 78 and alternately presented as a uniform field of illumination to the color wheel assembly 84.

The differential monitoring means 90 provides the detector and meter means for indicating when a null has been reached in normalization and pass-band spectral analysis.

The operation of the embodiment of FIGURE 3a is similar to that of FIGURE 3 with the exception that the settings of the light gate means M1 and M2 as read from the dials M1A and M2A, respectively, provide the data resulting from effecting a null indication on a suitable photoreceptor means (not shown).

In the operation of the embodiment of FIGURE 4, the normalization procedure is identical with that of FIGURES 1 and 2 for the transmission sample 34 if transmittance is to be used and also identical if a source sample is being analyzed.

In this embodiment, however, the calibrated crank 28 is utilized to position the calibrated aperture plates 114 and 116 either in synchronism or separately as desired to effect a null reading in response to the alternate reference and sample beams transmitted through the light chopper comprising the perforated shutter disk 130 and the filter means 138, and subsequently to the photoreceptor means (not shown).

Referring to FIGURE 5, the operation is identical with that described for the foregoing embodiments with the exception that the protractor mounted collimator means 144 is placed to effect a different angle of incidence of the beam from the reference source 140 with respect to the transmission sample 158, fluorescence or turbidity sample 160 and fluorescent or solid color reflectance sample 162 for each series of band-pass spectral analyses. With the latter sample the collimator means typically will remain in the lower half of the protractor angle shown in FIGURE 5, i.e., below the solid line position of the collimator means 144.

In operation of the embodiment of FIGURE 6, the sample sphere 12 and third sphere 164 are initially connected and the second reference source 166 is normalized with the first (not shown). The sample and third spheres 12 and 164 are then disengaged at the coupling 172 and the transmission sample 174 placed therebetween in the input aperture 146 of the said sample sphere.

The reference side, now shown, of the spectroradiometer is used, as in FIGURE 1 and the various pass-bands are analyzed for the sample 174.

In operation the embodiment of FIGURE 7, the sample sphere 12 is removed and the extension tube 176 is placed in its stead, for example, at the coupling flange 50 on the second tubular light stop 28 in FIGURE 1. Then the translucent, electro-luminescent, radio-luminescent, or other light emitting sample 180, that is uniformly luminous is held in place over the input aperture 178. The sample 180 is then normalized against the reference beam in the manner of FIGURES 1, 2, 3 and 4 and the various pass-bands are spectrally analyzed as hereinbefore described.

The operation of the embodiment of FIGURE 8 is identical with that of FIGURE 7 with the exception that there is the reference source of illumination 188 to impinge substantially at normal angles of incidence upon retro-reflective sample 196 or at other desired angles as sample 196 is positioned at various angles of incidence with the light from the half-silvered mirror 192. That reflective component that returns along the path of origin of illumination is in part transmitted to the sample path for analysis.

As for the operation of FIGURE 9, the primary difference from FIGURES 7 and 8 is that the sample source being analyzed is remote and a telescopic means of locating it and directing it into the sample sphere 12 to integrate the incoming light from the remote sample is provided. The sample is focused into the spectroradiometer via the eyepiece 204 to initiate the analysis. The remove sample is normalized with the reference source 18 of FIGURES 1, 2, 3 and 4 and the spectral analysis is then carried out as hereinbefore described. Alternatively, the means of FIGURE 9 may be used to collect light from a remote source and direct it along the sample path without use of the integrating sphere.

As can be seen from the foregoing specifications and drawings, this invention provides a ratio spectroradiometer that satisfies a long felt need in the art for both extreme research laboratory versatility and the practical ability to spectrally analyze self-luminous sample sources and thermal sources of less than one candle power at a relatively low cost.

It is to be understood that the several embodiments of the invention shown and defined herein are for the purpose of example only and are not intended to limit the scope of the appended claims.

What is claimed is:

1. In a ratio spectroradiometer, means directly analyzing the spectral emission of a sample radiant means relative to that of a reference radiant source, comprising, in combination:
    detector means;
    a reference source of radiation;
    first radiation integrating means optically coupled with said reference source;
    second radiation integration means adapted to be opticaly coupled with said sample radiant means;
    adjustable means intermediate said reference source and said first integrating means adapted to normalize said reference source with said sample radiant means;
    said first and second integrating means providing radiation outputs optically coupled with said detector means and having identical spectral characteristics of said reference source and said sample radiant means, respectively;
    said detector means including selectively adjustable radiation filter means optically coupled with and transmitting said radiation outputs in a selective plurality of spectral formats for purposes of analysis, and photosensitive means measuring the relative intensities of said radiation outputs; and
    calibrated attenuating means intermediate said integrating means and said detector means and optically coupled therewith for equalizing the intensity of said radiation outputs in each of said spectral formats.

2. The invention defined in claim 1, wherein said combination further includes sample radiant means comprising light transmitting means and a second reference source of radiation illuminating said transmitting means.

3. The invention defined in claim 1, wherein said combination further includes sample radiant means comprising a source of illumination located at a point remote from said spectroradiometer.

4. The invention defined in claim 1, wherein said spectral formats comprise selected spectral pass-bands as well as the tri-stimulus functions of human sight.

5. The invention defined in claim 1, wherein said first and second integrating means comprise first and second spherical cavities, respectively.

6. The invention defined in claim 1, wherein said combination further includes sample radiant means comprising a source of illumination located at a point remote from said spectroradiometer, and wherein said second integrating means includes telescope means for viewing said source of illumination which is remote from said spectroradiometer.

7. In a ratio spectroradiometer, means for directly analyzing the spectral emission of a sample radiant means relative to that of a reference radiant source, comprising, in combination:
    detector means;

a reference source of radiation;
first radiation integrating means optically coupled with said reference source;
second radiation integrating means adapted to be optically coupled with said sample radiant means;
said first and second integrating means providing radiation outputs having identical spectral characteristics of said reference source and said sample radiant means, respectively;
said detector means including selectively adjustable radiation filter means for selection of a plurality of spectral formats for purposes of analysis, and photosensitive means measuring the relative intensities of said radiation outputs;
third radiation integrating means having optical couplings with and receiving said radiation outputs of said first and second integrating means; and
means alternately communicating said first and second integrating means with said third integrating means;
said third integrating means being optically coupled with said filter means.

8. The invention defined in claim 7, wherein said combination further includes calibrated attenuation means at said optical couplings selectively determining the magnitude of radiation transmitted from said first and second integrating means to said third integrating means.

9. The invention defined in claim 7, wherein said integrating means each comprise a spherical cavity.

10. The invention defined in claim 1, wherein said combination further includes sample radiant means comprising a second reference source, a third radiation integrating means illuminated by said source and providing a radiation output, said third radiation integrating means and its radiation output being optically coupled with said second radiation integrating means, and sample means to be analyzed intermediate said second and third integrating means irradiated by said third integrating means.

11. The invention defined in claim 1, wherein said combination further includes sample radiant means comprising a second reference source of radiation, a reflectance sample, partially silvered mirror means positioned in the radiation from said second source to direct a portion thereof to said reflectance sample and to direct a portion of the radiation reflected from said sample to said second integrating means.

12. The invention defined in claim 1, wherein said photosensitive means comprises a single responsive device common to both said radiation outputs from said integrating means; and wherein said means directly analyzing the spectral emission of radiant means relative to that of said reference source further includes means alternately coupling said radiation outputs with said single responsive device of said detector means.

13. In a ratio spectroradiometer, means directly analyzing the spectral emission of a sample radiant means relative to that of a reference radiant source, comprising, in combination:
detector means;
a reference source of radiation;
at least two radiation integrating means;
means effecting alternate optical coupling of said sample radiant means and said reference source with said detector means through respective ones of said integrating means, without interaction between said sample radiant means and said reference source; and
adjustable means intermediate said reference source and said integrating means and in optical coupling therewith, for normalizing said reference source with said sample radiant means;
said integrating means providing radiation outputs having identical spectral characteristics of said reference source and said sample radiant means, respectively; and
said detector means including selectively adjustable radiation filter means transmitting said radiation outputs in a selective plurality of spectral formats for purposes of analysis, and photosensitive means measuring the relative intensities of said radiation outputs in each of said spectral formats.

References Cited

UNITED STATES PATENTS

| | | | |
|---|---|---|---|
| 1,672,672 | 6/1928 | Young | 250—228 X |
| 1,950,975 | 3/1934 | Davis. | |
| 1,964,365 | 6/1934 | Razek et al. | 250—228 X |
| 2,280,993 | 4/1942 | Barnes. | |
| 2,439,373 | 4/1948 | Stearns. | |
| 1,987,441 | 1/1935 | Hardy. | |
| 3,100,815 | 8/1963 | Drake et al. | |
| 2,325,350 | 7/1943 | West | 88—14 |
| 2,411,741 | 11/1946 | Michaelson. | |
| 2,601,327 | 6/1952 | Rose | 88—23 |
| 2,686,452 | 8/1954 | Bentley | 88—14 |
| 2,753,754 | 7/1956 | LeClair | 88—14 |

FOREIGN PATENTS 445,009   4/1936   Great Britain.

JEWELL H. PEDERSEN, *Primary Examiner.*

W. A. SKLAR, *Assistant Examiner.*

U.S. Cl. X.R.

250—228; 356—178, 179, 236